(12) United States Patent
Demsey et al.

(10) Patent No.: US 7,802,056 B2
(45) Date of Patent: Sep. 21, 2010

(54) MANAGEMENT OF DRAWING RESOURCES IN A NATIVE CODE PORTION USING CACHED DRAWING PARAMETERS

(75) Inventors: Seth M. Demsey, Kirkland, WA (US); Tuan Huynh, Seattle, WA (US); Christopher W. Lorton, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 11/772,649

(22) Filed: Jul. 2, 2007

(65) Prior Publication Data
US 2008/0016298 A1    Jan. 17, 2008

Related U.S. Application Data

(62) Division of application No. 10/293,448, filed on Nov. 13, 2002, now Pat. No. 7,240,346.

(51) Int. Cl.
*G06F 12/12*    (2006.01)
(52) U.S. Cl. .................. 711/133; 711/E12.01; 345/543; 345/557
(58) Field of Classification Search .................. 345/543, 345/549, 552, 557; 711/133, E12.01
See application file for complete search history.

(56) References Cited

U.S. PATENT DOCUMENTS 5,867,166 A * 2/1999 Myhrvold et al. ........... 345/419

(Continued)

OTHER PUBLICATIONS

IBM. "Effective Cache Mechanism for Texture Mapping." Dec. 1, 1996. IBM Technical Disclosure Bulletin. vol. 39. No. 12. pp. 213-218.*

(Continued)

*Primary Examiner*—Reginald G Bragdon
*Assistant Examiner*—Nathan Sadler

(57) ABSTRACT

Techniques for management of drawing resources are described. In an implementation, a reference count numeral may be associated with a drawing resource stored in cache memory. One may be added to the reference count numeral each time a new drawing resource is added to memory. In addition, one may be removed from the reference count each time an existing drawing resource is removed from the memory. Also, the drawing resource may be maintained in the cache memory when the reference count numeral is greater than zero.

10 Claims, 7 Drawing Sheets

U.S. PATENT DOCUMENTS

| | | | |
|---|---|---|---|
| 5,999,190 | A | 12/1999 | Sheasby et al. |
| 6,064,406 | A | 5/2000 | Atkinson et al. |
| 6,226,000 | B1 | 5/2001 | Richens et al. |
| 6,226,789 | B1 | 5/2001 | Tye et al. |
| 6,253,215 | B1 | 6/2001 | Agesen et al. |
| 6,825,848 | B1 * | 11/2004 | Fu et al. .................... 345/557 |
| 7,015,919 | B1 | 3/2006 | Stauffer et al. |
| 7,099,040 | B1 | 8/2006 | Cooper et al. |
| 7,124,407 | B1 | 10/2006 | Wallman |
| 7,240,346 | B2 | 7/2007 | Demsey et al. |
| 7,546,607 | B2 | 6/2009 | Demsey et al. |
| 7,596,787 | B2 | 9/2009 | Demsey et al. |
| 2002/0036663 | A1 * | 3/2002 | Meldrum et al. ............ 345/848 |
| 2003/0007004 | A1 | 1/2003 | Kanungo et al. |
| 2007/0283359 | A1 | 12/2007 | Demsey |
| 2008/0016513 | A1 | 1/2008 | Demsey |

OTHER PUBLICATIONS

Joshua Levenberg. "Fast View-Dependent Level-of-Detail Rendering Using Cached Geometry." Oct. 27-Nov. 1, 2002. IEEE. IEEE Visualization 2002.*

C.-W. Ku, L.-G. Chen, and T.-D. Chiueh. "Cache Vector Quantisation Algorithm in Video Compression." Aug. 1993. Electronic Letters. pp. 1423-1424.*

Stefanos Kaxiras, Zhigang Hu, and Margaret Martonosi. "Cache Decay: Exploiting Generational Behavior to Reduce Cache Leakage Power." May 2001. IEEE. ISCA 2001.*

"Notice of Allowance", U.S. Appl. No. 11/772,747, (Jul. 13, 2009),10 pages.

"Non-Final Office Action", U.S. Appl. No. 11/772,674, (Jul. 9, 2009),9 pages.

Pittman, Thomas "Two-Level Hybrid Interpreter/Native Code Execution for Combined Space-Time Program Efficiency", Kansas State University, ACM, (Jun. 1987),pp. 150-152.

"Final Office Action", U.S. Appl. No. 11/772,674, (Feb. 1, 2010),15 pages.

"Non-Final Office Action", U.S. Appl. No. 11/772,674, (Jun. 11, 2010), 14 pages.

"Final Office Action", U.S. Appl. No. 11/772,674, (Aug. 4, 2010), 13 pages.

* cited by examiner

MANAGEMENT OF DRAWING RESOURCES IN A NATIVE CODE PORTION USING CACHED DRAWING PARAMETERS

RELATED APPLICATION

This application is a divisional of and claims priority to U.S. patent application Ser. No. 10/293,448, now U.S. Pat. No. 7,240,346, filed on Nov. 13, 2002, the disclosure of which is incorporated by reference herein.

BACKGROUND

When executing code in a virtual machine (VM) environment, a user application program can run on different platforms. In such VM computer environments, native resources are typically allocated using system calls. In many computer-based drawing programs, a new drawing resource (such as a brush or a pen) is produced each time a new drawing object is created. Often, it is easy for developers to neglect the effects on the processor speed of producing a large number of drawing resources in drawing programs.

Managing each drawing resource generates system calls across a VM/native boundary between the managed code portion and the native code portion. System calls across this VM/native boundary demand considerable processor effort due to the varied code translations that may be necessary for virtual machines to comply with different computer platforms and languages, as well as the considerable amount of data that precisely describes each drawing resource. The garbage collection associated with removing the large number of drawing resources is considerable since each drawing resource has to be consciously removed individually, or alternately the drawing resources are removed after some prescribed period. If the drawing resources are removed after some period, then there may be a considerable number of drawing resources waiting for their duration to be removed. Storing such a considerable number of drawing resources may make such tasks as drawing programs slow in drawing programs. Additionally, present computer drawing programs typically produce multiple concurrently-saved copies of the drawing resource. For example, as the drawing resource is transferred between the VM, the native OS, and the OS itself, a copy of each drawing object is stored in memory associated with each location.

Drawing programs that run on such computer environments as stand alone computers, networked computer environments, and computer devices typically inefficiently manage such drawing resources, but such inefficiency is typically ignored due to the large processing abilities of these computer environments. Smaller and less powerful, memory constrained and processor constrained devices (i.e. resource constrained devices) such as PDA's, cellular telephones, computer devices, embedded devices, microprocessor devices, and microcomputer devices are becoming increasingly popular. Resource constrained devices rely on more limited software and operating systems than those applied to full size computers. Applying a large number of system calls to resource constrained devices commonly makes the system prohibitively slow to perform many drawing functions. The code transitions necessary for system calls in resource constrained devices that have been produced between the native code portion and the managed code portion in virtual machines (especially for demanding programs as drawing programs) are so processor intensive that the processor and memory resources become highly strained.

It would therefore be beneficial to improve the management of drawing resources within computer environments.

SUMMARY

This disclosure relates to a method and associated system for drawing within a computer environment with a drawing resource.

In one aspect, the computer environment includes a managed code portion and a native code portion. The computer environment compares a draw call value being passed from the managed code portion to the native code portion with a stored drawing resource value stored in the native code portion. If the draw call value is the same as the stored drawing resource value, then the system is already configured to draw using the stored drawing resource onto a native drawing surface included in the native code portion using the stored drawing resource. If the draw call value is not the same as the drawing resource value, then a new drawing resource is created in the managed code portion, and that new drawing resource is selected into the native drawing surface.

In another aspect, a method of communicating between the managed code portion and the native code portion includes transmitting a drawing resource feature portion from the managed code portion to a native code portion. The data associated with the entire drawing resource does not have to be transmitted. Managing the drawing resources in native code reduces the number of native drawing resources needed to be managed by the native OS and reduces the number of system calls across the VM/native boundary between the managed code portion and the native code portion. This reduction in the number of system calls results in increases in efficiency and speed.

BRIEF DESCRIPTION OF THE DRAWINGS

The same numbers are used throughout the drawings to reference like features and components.

DETAILED DESCRIPTION

Figure 1:
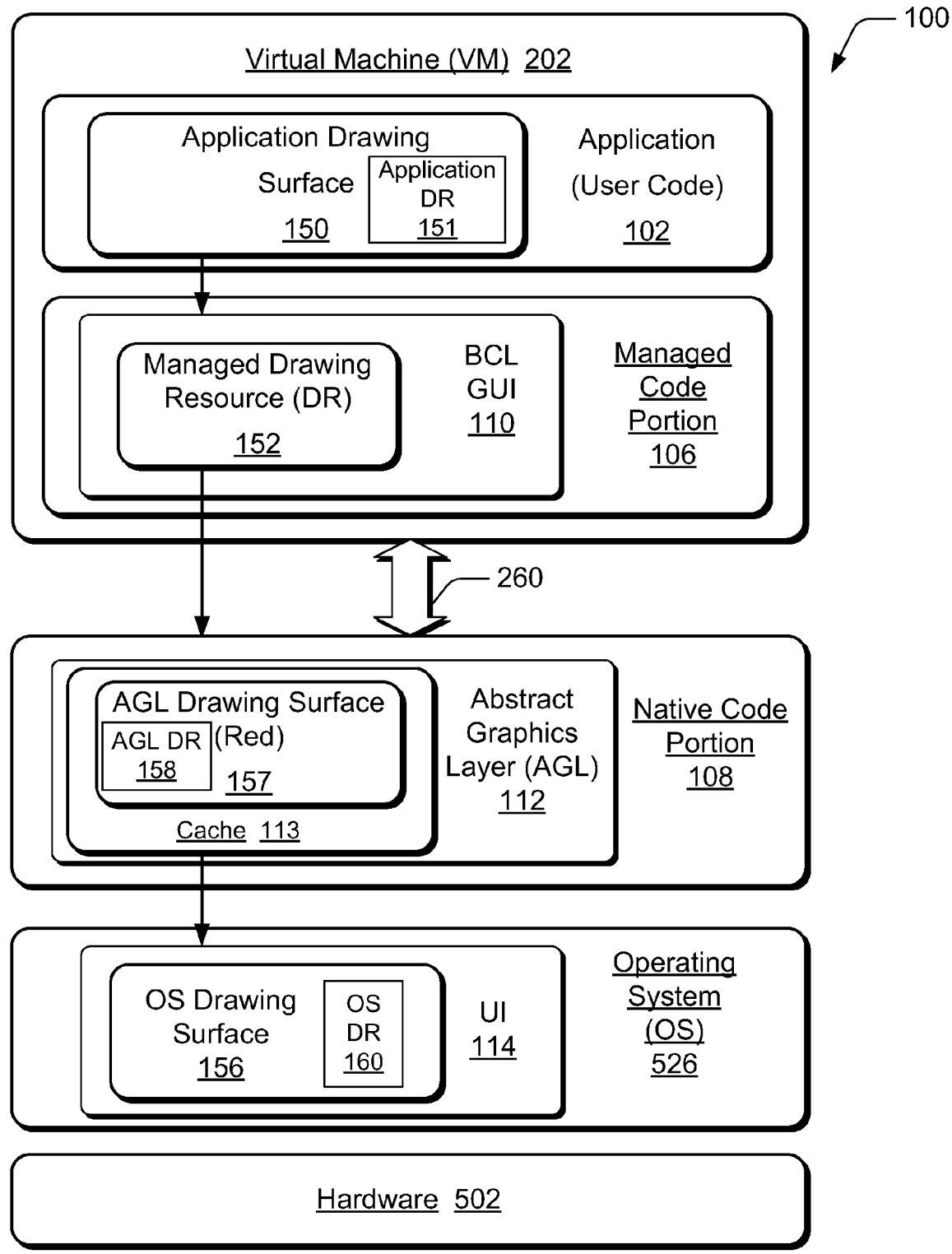
FIG. 1 illustrates one embodiment of a computer environment integrating a virtual machine, the computer environment including a native code portion and a managed code portion.

Often, software developers wish to allow users to draw objects, bar charts, figures, etc. using drawing resources in an efficient manner. In drawing programs, drawing resources draw using drawing primitives such as lines, rectangles, etc. Drawing resources such as pens or brushes each have drawing parameters that may include one or more of color, weight, style, and gradient. The drawing resource parameters relating to text include, for example, color, font, size, and style. This disclosure describes a drawing resource in which the user can control color, though it is understood that using other parameters in any drawing resource is within the scope of the parameters. One embodiment of drawing resource that is managed within a computer environment 100 is illustrated in FIG. 1, which creates a drawing image 418 on a drawing surface 404 that is described subsequently relative to FIG. 4.

In this disclosure, the term "drawing" refers to programs and processes (e.g., software and/or firmware) such as drafting, font, painting, graphics, etc. that allow users to generate and/or manipulate displayed objects.

The FIG. 1 embodiment of computer environment 100 utilizes a virtual machine (VM) architecture 202 to run on different platforms (i.e., interface having different operating systems and different application programs). The VM 202 uses a network framework (such as included in Java, or the .NET computer software produced and distributed by Microsoft® Corporation). The computer environment 100 comprises an operating system (OS) 526 and a computer or hardware 502, as described below. In one embodiment, a cache which forms part of the native portion stores data from the system calls that is associated with one or more varied drawing resources. The user interface of the VM 202 is intended to be small and performance directed as to user input and how it displays information on the screen. The goals of the VM 202 include enhancing the size, performance, and flexibility of the drawing program.

Though the concepts described here are applicable to all computer environments 100 in general including laptops, personal computers, networks, mainframes, etc.; they are especially beneficial to such resource constrained devices (that have a relatively small processor and/or memory) as PDA's, cellular telephones, computer devices, embedded devices, microprocessor devices, and microcomputer devices. To provide some scale, such resource constrained devices are less than $1/20^{th}$ of size of many desktop or laptop computers (and often less than $1/60^{th}$). The relatively small size, and somewhat simplified operation, of the resource constrained devices dictate that the designers program effectively and in a manner that complies with platform guidelines.

The computer environment 100 includes a virtual machine (VM) 202 (which includes an application program 102 and a managed code portion 106), a native code portion 108, and an operating system (OS) 526. The managed code portion 106 and the native code portion 108 contribute to a managed execution process for the drawing program. The native code portion 108 sits directly on the OS 526, and communicates using the native code language of the OS. Therefore, the native code portion 108 compiles for the OS 526 directly. As such, the native code portion 108 codes in such native computer languages as C, C++, Basic, etc. which the OS can handle. The native code portion 108 contains such features, for example, as a just in time (JIT) compiler, a class loader, a garbage collector, an execution environment, and/or an interpreter.

The managed code portion 106 sits on top of the native code portion 108. The managed code portion contains a variety of class libraries that are utilized by the application program. One example of a class library that is included in the managed code portion 106 is a graphic user interface (GUI) code library 110 which may be coded in byte code language (BCL) which is an intermediate language between the language of the application program 102 and that of the native code portion 108. The GUI library 110 largely determines the characteristics of the interaction between the user of the computer environment 100 and the computer environment, and also determines the types of experience that the user will have when using any particular application program.

Figure 6:
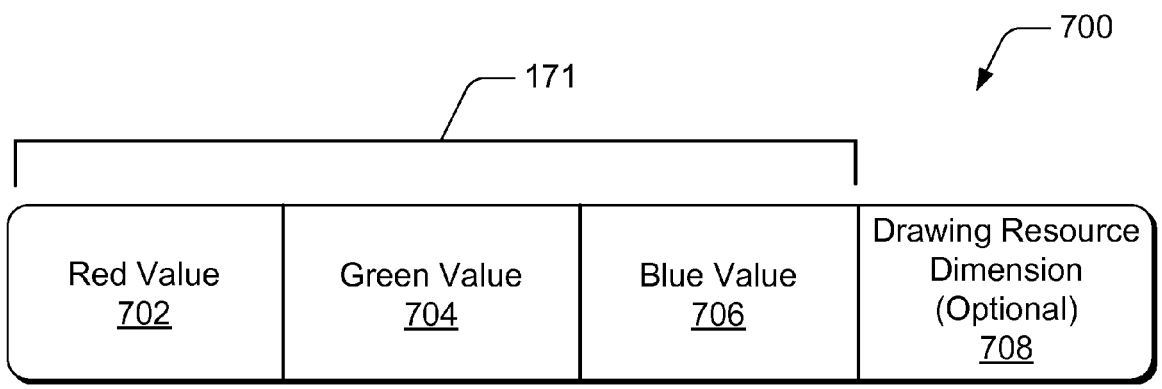
FIG. 6 illustrates one embodiment of drawing resource parameter string that contains information relating to prescribed parameters of a drawing resource, such as a brush or pen.

One embodiment of the disclosure relates to decreasing the amount of data associated with signal calls, and more particularly draw calls. Instead of each system call containing the full amount of data necessary to describe the drawing resource, one embodiment of the system call contains a brief description of one characteristic of the drawing resource such as color. FIG. 6, as described below, illustrates storage of the red, green, and blue (RGB) color values. In this disclosure, brief system parameter calls are system calls that contain characteristic parameter information relating to color, width, and/or other characteristics of the drawing reference. For example, a brief draw call is called a draw parameter call. In general, system parameter calls are easier to formulate than system calls due to their shorter length. Additionally, characteristic values (e.g., RGB values) stored in system parameter calls are easier to compare with other values, process, and/or store than the values stored in system calls due to the smaller data size (often 32 bit or less). By comparison, complete system calls are often four 32 bit integers (with each integer representing one of red, green, blue, and alpha. It is the overhead of the custom marshalling (non-base system type, e.g., color vs. integer) that is actually the cost. It is especially beneficial to have system parameter calls traverse the boundary between the native code portion 108 and the managed code portion 106 due to the smaller dimensions, and ease of translating between the different codes, compared to system calls.

The user interface (UI) libraries commonly call code using system codes from a managed code portion 106 through to the native code portion 108 to the operating system. Such system codes can be used to perform relatively low level functionality as drawing and window management. The managed code portion 106 is in the language of the user application program 102 and the intermediate language.

The identity of certain VMs 202 is evident from the output. For example, when a Java applet runs, a skilled user or developer can positively identify it as a Java applet. Other embodiments of VMs, by comparison, are seamless and consistent with the native device application program. A pocket PC application running on the same VM 202 therefore looks and feels differently from a smart phone application or an embedded controller application. As such, the appearance and characteristics of each application program that runs on each respective OS 526 is primarily determined by the developer of that particular application program, and not the particular VM. Each application program looks and feels like the application program as developed by the developer for the OS 526.

The application or application program 102 is typically programmed by a code developer to provide the functionality of the computer environment 100. The developer typically programs the code for the application program, and has the program compiled, loaded, and linked to create the executable file (.exe) for the application program. The .exe file is executed by the user of the computer environment 100 to run the application program, and therefore causes the application program to perform as desired by the user.

As illustrated in FIG. 1, the GUI library 110, the abstract graphics layer (AGL) 112, and a user interface (UI) code layer 114 are contained within and associated with the managed code portion 106, the native code portion 108, and the operating system 526, respectively. As such, system parameter calls that are generated by the application program 102 (e.g., by user input or program libraries) are transmitted through the GUI library 110 of the managed code portion 106, to the AGL 112 of the native code portion 108, and to the UI layer 114 of the OS 526. Similarly, certain system parameter calls that are generated by the OS 526 are transmitted through the UI layer 114, to the AGL 112 in the native code portion 108, to the GUI library 110 of the managed code portion 106, and to the application program 102.

Greater interoperability between networked computer devices and/or environments 100 enhances the users and developers experience of drawing programs and increase the acceptance of drawing programs that run on stand-alone computers and on such networks as the Internet, intranets, local area networks (LAN), and wide area networks (WAN). The computer environment 100 generally allows for such interoperability for many different networked computer devices such as personal computers, telephones, workstations, PDAs, embedded controller devices, etc. that have different operating systems and do not necessarily communicate or interface well. Additionally, the computer environment 100 effectively displays data originating from different drawing programs that run on the same, or different, computers. As such, much of the data prepared by one application program or operating system and then processed and/or stored by many network servers can be considered "images" which should be able to be effectively used by another application program or OS.

A user, or software developer, of the computer environment 100 shown in FIG. 1 can create a drawing resource within the AGL 112 in the following exemplary manner. A drawing resource that is "created" has to go through certain processes, as described below, before it can be "drawn". The drawing resource has to be drawn to be visible over a display of the computer environment 100. In the computer environment 100, the drawing resources are drawn in the native code portion 108 and/or the OS 526. An application drawing surface 150 is initially created by the user or developer interfacing with the application program 102 (e.g., in source code, XML, or another programming language). Each application drawing surface 150 can be considered as a window (or analogous to a piece of paper) with similar attributes to a window that will be displayed over the window-based OS 526. At the level of the OS 526, the drawing resource is positioned to "draw" at a location on the OS drawing surface 156.

For the purpose of this disclosure, it is important to differentiate "creating" a drawing resource from "drawing" with a drawing resource. A drawing resource is created when it is initiated in the managed code portion 106. During creation, if the drawing resource is created, it will neither be realized in the OS 526 nor will it appear on the display of the computer environment. When a drawing resource is used (described in a draw parameter call being sent from the managed code portion 106 to the native code portion 108), the drawing resource can be displayed on the display of the computer environment because it is contained in the native code portion 108.

Figure 2:
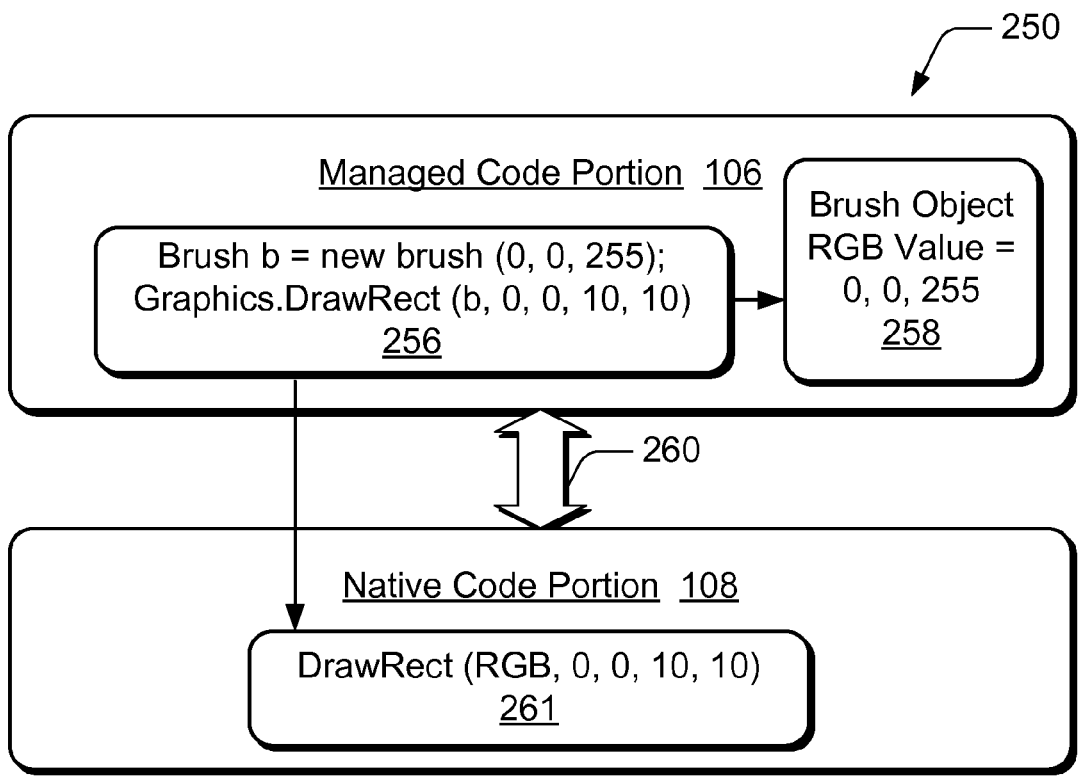
FIG. 2 illustrates one embodiment of the coded communications between the native code portion and the managed code portion illustrated in FIG. 1.

FIG. 2 illustrates one embodiment of computer code 250 that may be utilized within the managed code portion 106 and the native code portion 108 to control the operation of in the computer environment 100 shown in FIG. 1. The VM/native boundary 260 may be considered as the boundary between the managed code portion 106 and the native code portion 108. The computer code 250 includes the managed code portion 106 (that can be considered a part of the VM 202) and a native code portion 108. An execution engine of the VM 202 as shown in FIG. 1 may be considered to process intermediate code of some format, and thereby cause the desired program to execute. Such an execution engine could exist on a variety of OS, which may or may not be configured with virtual memory.

One embodiment of the managed code portion 106, as illustrated in FIG. 2, includes a VM drawing specification object 256 and a VM drawing object 258 (which are both in the managed code). The VM drawing specification object 256 contains sufficient information to produce the drawing specification object 256 in managed code and a native drawing object 261. The native code portion 108 includes the native drawing object 261, which is in the native code. When the user code creates a drawing resource in the managed code portion 106, as shown in FIG. 2, the object characterizing the drawing resource exists in the managed space. Once the drawing resource is used in a draw parameter call, the value of the object is passed to native code portion 108, and the native drawing object 261 is not marshaled. The VM drawing specification object 256, as illustrated by the information contained in FIG. 2, indicates that a rectangle will be drawn with brush b with coordinates 0, 0, 10, 10. The draw parameter call that transfers data from the managed code portion 106 to the native drawing object 261 of the native code portion 108, extracts a color value and conveys the color value to the AGL 112 of the native code portion. The native drawing object 261 in the AGL 112, contains the characteristic parameter (e.g., color information), and not other information that clearly defines the characteristics of the drawing resource. As such, draw parameter calls convey color information, but not the other information about the drawing resources.

The cache 113 in the AGL 112 that contains one or more drawing surfaces exists in native code portion 108. In one embodiment, the cache 113 contains a first cached value for the last used drawing resource (e.g., a red pen), while the cache contains a second cached value for each recently used drawing resource that contains different information (e.g., red pen and black pen). The cached value stored within the AGL 112 may be null if the particular drawing resource is being used for the first time.

To illustrate more about system parameter calls and drawing using drawing resources within one embodiment of the drawing program run on the computer environment 100, assume that the following commands are the requested inputs by the user of the computer environment 100:
DRAW RECTANGLE (RED)
DRAW CIRCLE (RED)
DRAW CIRCLE (RED)

These three commands cause one red rectangle and two red circles to be drawn on the OS drawing surface 156. Instead of drawing with three distinct drawing resources (e.g., red brushes or pens) using the associated draw parameter calls to produce the one rectangle and two circles, the AGL 112 in the native code portion 108 creates a single red drawing resource that is used by the OS 526 to draw the rectangle and the two circles on the OS drawing surface 156.

The draw parameter call travels from the application program 102 via the managed code portion 106 and the native code portion 108 (and to the operating system 526) each time a drawing resource is drawn. Transmitting a large amount of data as associated with the prior-art system calls (compared to the smaller amount of data associated with the system parameter calls or draw parameter calls) between the managed code portion 106 and the native code portion 108 is a processor taxing event considering the code difference and the associated language translation between the managed code portion 106 and the native code portion 108. As such, reducing the data contained in at least some of the draw parameter calls diminishes the processor and memory load applied to the computer environment 100, which is especially important for resource constrained devices.

In general, data relating to the drawing resources, drawing surfaces, and the associated system draw parameter calls migrate from the application program 102 to the operating system 526 as illustrated in FIG. 1. Such migration of data in system parameter calls flow from the respective application drawing surface 150 and application drawing resource 151 in the application program 102; to the respective managed drawing resource 152 and the managed drawing surface (not shown) in the managed code portion 106; and to the respective native drawing resource 158 and the native drawing surface (not shown) in the AGL 112 of the native code portion 108. The characteristic data (e.g. color information) of the native drawing resource 158 is applied to the respective OS drawing surface 156 and the OS drawing resource 160 within the operating system 526. System parameter calls that travel from the operating system 526 to the application program pass through similar components in the reversed direction.

To reduce the amount of data traveling between the application program 102 and the native code portion 108, the number of system calls is reduced in system parameter calls and/or the amount of data contained within each system call is reduced for each system parameter call. In one embodiment, one integer (packed) that represents the color value (8 bits r, g, and b, potentially alpha as well=32 bits) is passed instead of a custom type that needs to be marshaled to the native representation, ie:

```
public struct Color
{
    int red;
    int green;
    int blue;
    int alpha
}
```

Such reduction in the amount of data transferred in system parameter calls is especially important to improve operational characteristics of resource constrained devices. Though less data is transferred across a VM/native boundary 260 between the managed code portion 106 and the native code portion 108; the data transferred within the system parameter call is sufficient to determine whether the drawing resource being transmitted within the system parameter call contains the same or a similar parameter (e.g., is red in color) to the drawing resource presently contained in a memory cache location. The term "similar" is used since slightly different parameter values that likely appear identical on the display of the computer environment are within the scope of the present invention. For example, two slightly different RGB values, while literally different from each other, may be close enough to produce indiscernible differences when displayed, and therefore be considered substantially the same. Additionally, different computers that are communicating with each other, or different application programs, may not be capable of transmitting the same value, and therefore approximate values can be used.

If the drawing resource in the system parameter call does result in a similar parameter within a drawing resource stored in the cache 113 in the AGL 112, then the system parameter call and the associated data corresponding to the drawing resource will not migrate to the OS, and the logical representation of the drawing resource within the cache 113 (more specifically the current cache value 406 shown in FIG. 4) in the AGL will be maintained in the cache. If, by comparison, the drawing resource in the system parameter call does not contain a similar parameter to the drawing resource in the AGL 112, then the system parameter call and its associated data will migrate to the OS, and the logical representations of the two drawing resources will be stored as the current cache value 406 within the AGL 112.

During the system parameter call, the managed code portion 106, in byte code language, system parameter calls across the VM/native boundary 260 to the AGL 112 to draw the red rectangle and two red circles. The managed code portion 106 parameter calls to the AGL 112 to draw a red rectangle when the managed code portion attempts to draw using the first red drawing resource in the OS 526. The AGL 112 then initiates logical representations of both the AGL drawing surface 157 and the AGL drawing resource 158 within the AGL 112. The AGL drawing resource 158 is the logical representation of the OS drawing resource 160, and contains, e.g., color information that can be utilized by the OS drawing resource. The OS drawing resource 160 can be considered as the actual drawing resource residing within the OS 526. The characteristics of the OS drawing surface are provided by the logical representation of the AGL drawing surface 157 in the AGL 112.

For each drawing resource that is created and is used to draw as the OS drawing resource 160, the computer environment follows the following method. If the user wishes to create a drawing resource of the same color as one already created, the previously-created drawing resource of the same color (which is logically stored in the AGL 112 as the logical representation of the drawing resource) can be used to create the OS drawing resource 160.

Figure 3A:
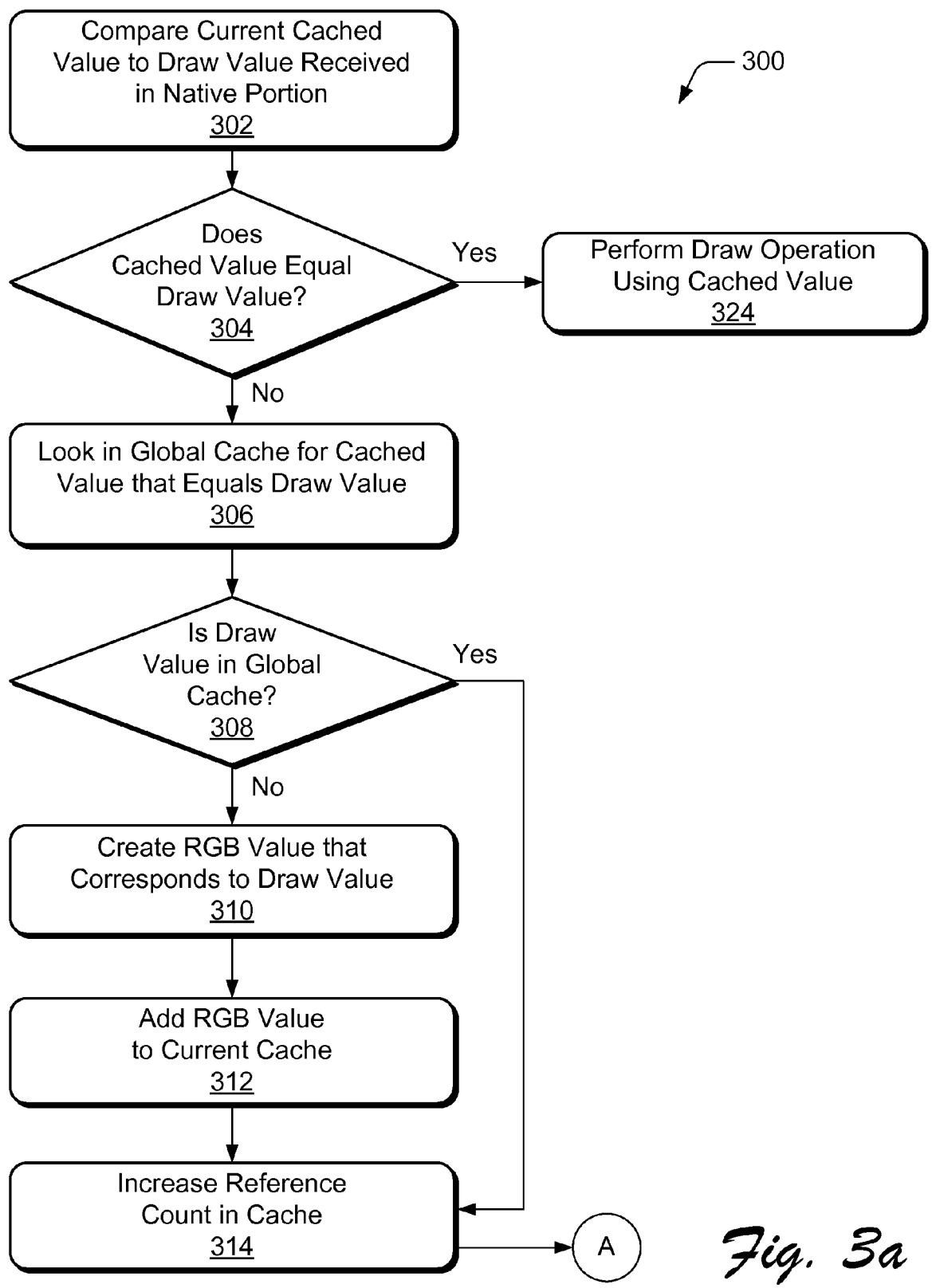
FIGS. 3a and 3b illustrate a flow chart of one embodiment of a drawing resource control method that may be performed on the computer environment shown in FIG. 1.
Figure 3B:
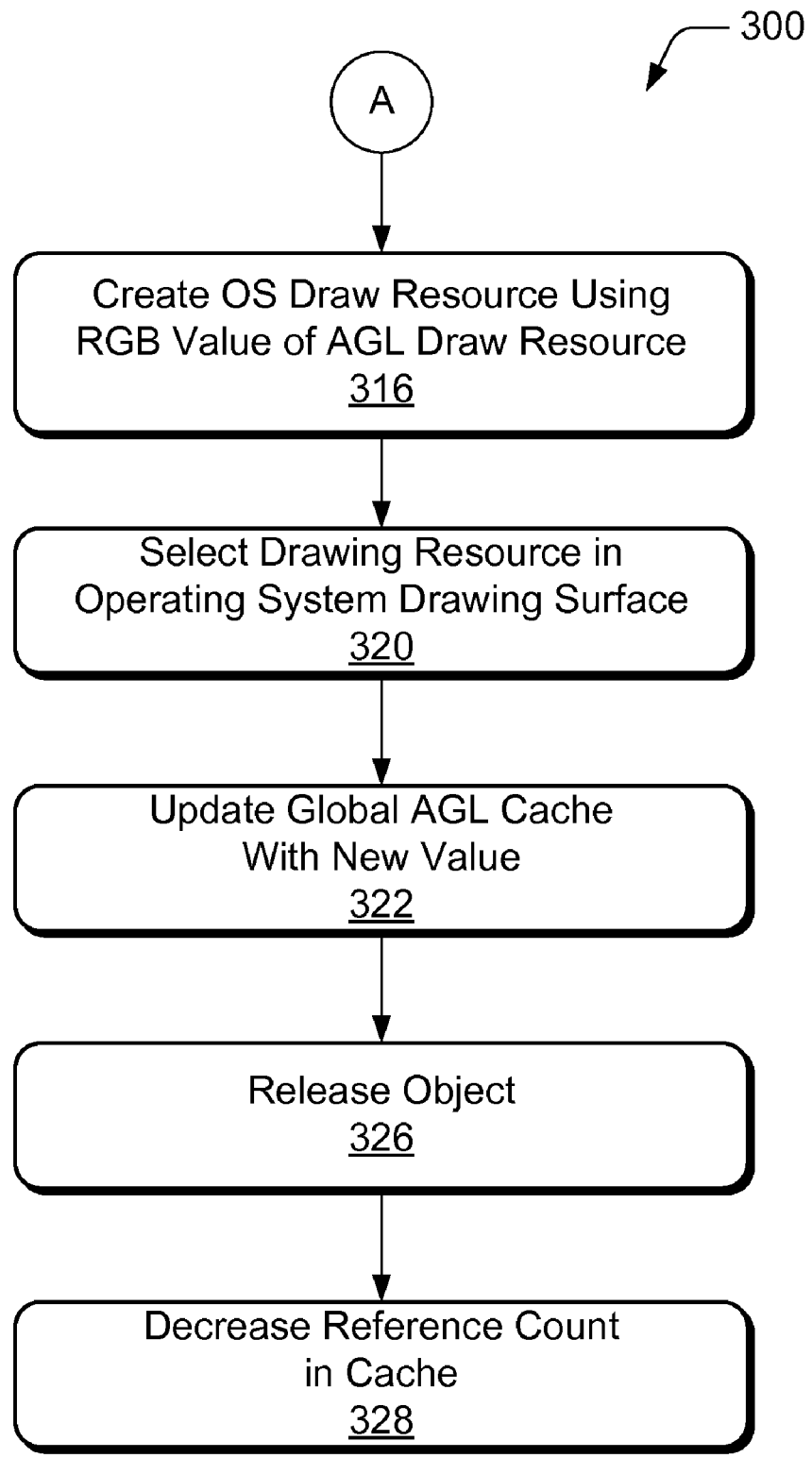

FIGS. 3a and 3b show one embodiment of drawing resource control method 300 that manages the production of drawing resources within the computer environment 100 as illustrated in FIG. 1. The drawing resource control method 300 provides for a small footprint of the VM 202 (i.e. the network framework). This small footprint is important to allow the drawing program to be applied to a broad range of resource constrained computer devices or environments 100. This UI performance improvement of the drawing resource control method 300 configures the drawing resource control method to run indistinguishably from the manner intended by the designer of the native code.

During the drawing resource control method 300, the language relating to the parameter calls is maintained in native code portion 108. As such, the code representing the drawing resource object need not be translated as the drawing resource object is transferred between locations under the control of the VM within the native code portion 108 and the native OS within the native code portion 108. The translation effort and time is thus reduced as the drawing object is transferred between the influence of the VM and the influence of the native OS. The drawing resource control method 300, as shown as a method in FIGS. 3a and 3b, and also relative to the AGL 112 in FIG. 4, occurs at draw-time (i.e., run time).

The functionality of multiple drawing resources can be provided using a single drawing resource provided at least one parameter of the large number of drawing resources matches that of the single drawing resource. As such, for each drawing surface, if you use the same drawing parameter (e.g., color) in different drawing resources, the program does not have to re-create the drawing resource each time a new drawing resource is created. Instead, a single drawing resource can provide the functionality of all of the drawing resources in any drawing surface that has the same parameter. The functionality of the drawing resource is provided by caching the parameter(s) of the drawing resource in the cache 113 located in the AGL 112. At run time, the drawing resource exists as a lightweight process model. In a single process of one execution environment, multiple application programs can run. If multiple application programs are running at a single instant, then the computer environment can share drawing resources.

Figure 4:
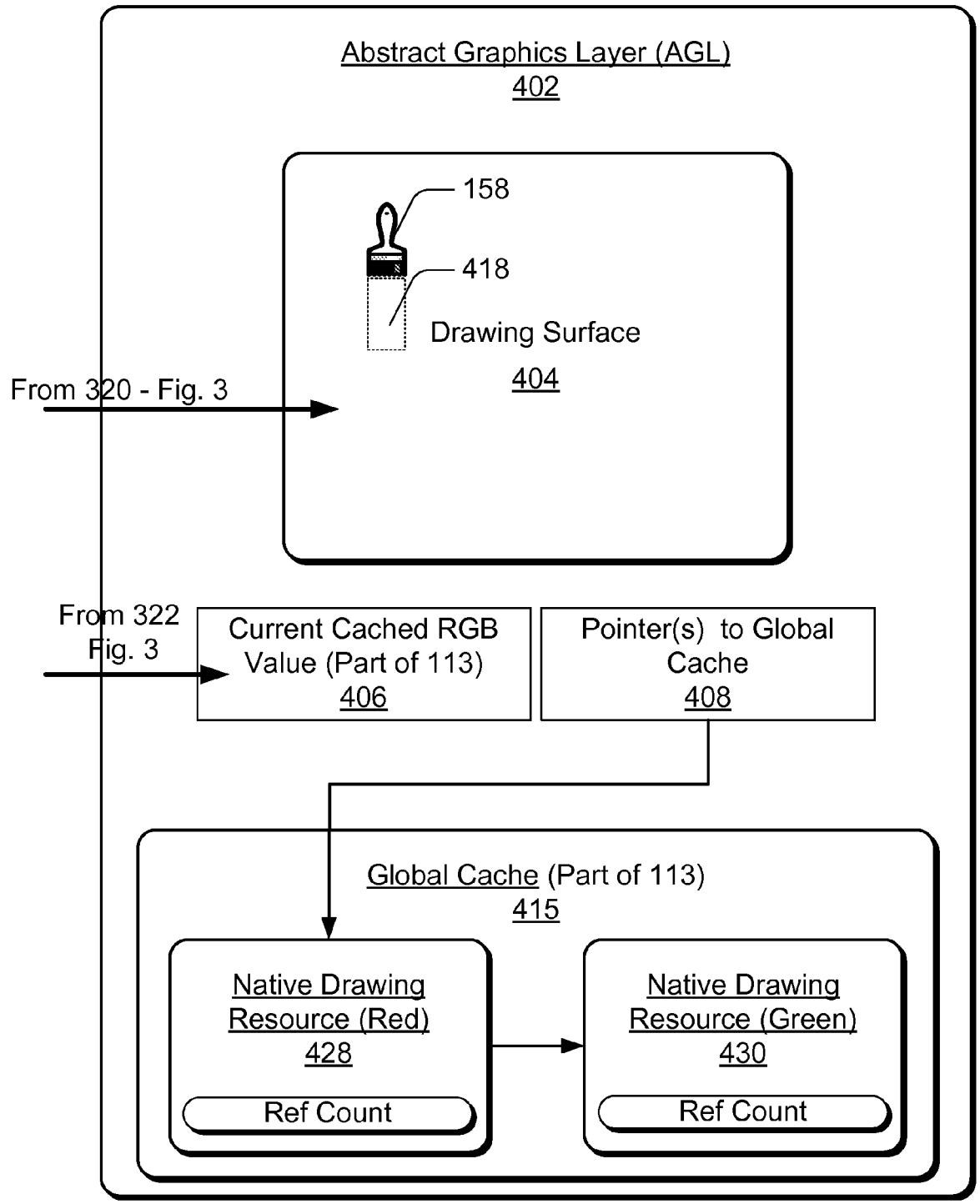
FIG. 4 illustrates one embodiment of an abstract graphics layer (AGL) that is contained in the native code portion of one embodiment of the computer environment.

The drawing resource control method 300 of FIGS. 3a and 3b, as read in conjunction with the embodiment of the AGL 112 shown in FIGS. 1 and 4, provides one embodiment by which drawing resources are efficiently created and maintained so a drawing program can be utilized without creating an excessive number of drawing resources to store in the OS 526.

The description of the drawing resource control method 300 relates to FIGS. 3a, 3b, and 4. As illustrated in FIG. 4, there are two locations that serve as the cache 113 that are both contained within the AGL. First, there is a current RGB cache 406 that contains the current characteristic value (e.g., color) of the OS drawing resource 160. Second, there is a global cache 415 that contains the stored characteristic value of the drawing resources that can be accessed and used to draw without requiring another draw call from the managed code portion 106 to the native code portion 108. A pointer to the global cache 415 provides one embodiment by which the plurality of drawing resources 428, 430 within the AGL 112 can be accessed. In FIG. 4, the drawing resources 428 and 430 are displayed as being stored in the global cache 415 in the form of a linked list that uses pointer technology. The global cache 415, however, can be arranged in any manner that permits storage, retrieval, and other management of the drawing resources 428 and 430 such as database, tabular, and other known data storage techniques.

In FIGS. 3a and 3b, if a drawing resource can be located within the current RGB cache 406 in the AGL 112 that is sufficiently similar to a new drawing resource that is transmitted from the managed code portion 106, then the existing drawing resource in the native code portion can be used and a new drawing resource does not have to be created.

One embodiment of the drawing resource control method 300, which occurs primarily in the native code portion 108, starts with a draw parameter call value being passed from the managed code portion 106 to the native code portion 108 during the draw parameter call. In 302, the current cached value (which is stored in the current RGB cache 406 that represents the characteristic color of the currently used drawing resource) is compared to the draw value received in the draw parameter call. If the current cached value in the current RGB cache 406 is the same as the received draw value in decision 304, then the drawing resource control method 300 performs a draw operation in 324 using the drawing resource defined by the cached characteristic color value contained in the OS drawing resource 160 as reflected by the current RGB cache 406.

If in decision 304, the cached value in the current RGB cache 406 differs from the received draw value contained in the draw parameter call, the drawing resource control method 300 continues to 306. In the portion of the drawing resource control method 300 that follows decision 304, an AGL drawing resource 158 as shown in FIG. 1 either has to be found in the global cache 415 or generated. In 306, the AGL 112 looks in the global cache 415 within the AGL 112 for a stored cached value (that contains characteristic parameter information that is stored in a configuration similar to as shown in FIG. 6) corresponding to all the drawing resources that can be accessed within the native code portion.

The drawing resource control method 300 continues to decision 308. If the AGL 112 determines in decision 308 that there is a cached value within the global cache 415 that equals, or is suitably close to, the received draw value contained in the draw parameter call, then the AGL uses the value stored in the global cache 415 to find the drawing resource. The process of finding the drawing resource uses the value stored in the global cache 415 to access the corresponding OS drawing resource, in which the drawing resource control method 300 continues to 314 as described below. If it is determined within the decision 308 that there is no cached value within the global cache 415 that equals, or is suitably close to, the received draw value contained in the draw parameter call, then the drawing resource control method 300 continues to 310 in which the computer environment 100 starts to create a new AGL draw resource. Following 310, the drawing resource control method 300 then continues to 312 in which the AGL draw resource created in 310 is added as the current cached RGB value 406 shown in FIG. 4. As such, any further draw resource creations will detect the draw resource created in 310 and 312 as having current cached RGB value 406.

The drawing resource control method 300 continues to 314 (following either 308 or 312 as described above) in which the reference count of the item in the cache 113 is increased to comply with the addition of the native draw object in the global cache 415. In one embodiment, the reference count is used to indicate whether a particular drawing resource is being actively utilized within a reasonable time frame, and therefore whether the system should allocate the necessary memory resources to maintain the drawing resource or whether the drawing resource should be destroyed. There are a variety of other embodiments of counting mechanisms that may be used to accomplish the same result. When a particular drawing resource is no longer needed, it should be destroyed so that the system can use that memory for other purposes. The particular time frame selected to return a drawing resource as active can vary depending on the particulars of the drawing program, the designer's wishes, and the particulars of the computer environment 100. Associating the reference count with drawing resources such as pens, brushes, and fonts acts to ensure that similar drawing resources don't have to be created and/or stored for each drawing resource object.

An object's reference count relates to the number of times that a similar object has been requested. Each time an object is requested, the reference count is incremented. An application releases an object when that object is no longer needed 326, thereby decrementing the reference count 328, shown in FIG. 3b. As long as the reference count is greater than zero, the object remains stored in the memory. An AGL object reference count is decremented when the managed object counterpart is finalized during GC or manually disposed of. That's the only time the reference count goes down. In one embodiment, the AGL object is often maintained with a reference count equal to 0 until the application reaches the UI idle state (defined to be the app state when there's no message pending in the message queue) or there's GC memory pressure. The user does not need to know the reference count of an object. As long as the object's interfaces are obtained and released properly, the object will have the appropriate lifetime.

The number of drawing resources stored in the native code portion can be controlled by cleaning each drawing resource from the native code portion (i.e., the cache 113 in the AGL 112), when the reference count equals zero. In one embodiment, each drawing resource in the native code portion can be removed if the user does not perform some action indicating user activity relative to the drawing resource (for example, the user does not touch the keyboard and/or use the mouse for a second).

The drawing resource control method 300 continues to decision 316 in which an OS drawing resource 160 is accessed or created using the draw value contained within the stored or created AGL draw resource 158. The draw value is contained as the characteristic RGB value stored in the global cache 415 in the AGL draw resource 158. The characteristic RGB value can be stored as a 32 bit value as illustrated in FIG. 6, and therefore the ease of transfer of the characteristic RGB value is relatively easy. The OS drawing resource 160, by comparison, is a full drawing resource (compared to the drawing resource parameter string used in the AGL, and described below relative to FIG. 6) since it contains the necessary data to draw on the OS drawing surface 156.

The drawing resource control method 300 continues to 320 in which the OS drawing resource is selected by the user to draw on the OS drawing surface 156 as illustrated in FIGS. 3a and 3b. Each OS drawing surface 156 may be associated with a plurality of OS drawing resources 160 that have a different color (or other characteristic value). Each OS drawing surface 156 may appear on the display of the computer environment 100 as a window that may be similarly interfaced with, such as other word processing, spreadsheet, or other application programs. A single brush, pen, or font stored in the global cache 415 in the AGL can be accessed and selected to draw into multiple drawing surfaces simultaneously.

The drawing resource control method 300 continues to 322 in which the characteristic RGB color stored in the current RGB cache 406 (which contains the draw characteristic value stored in the AGL 112) is updated with the new RGB characteristic value. This ensures that the current RGB cache 406 in the AGL 112 contains the RGB characteristic value corresponding to the most-recently selected OS drawing resource 160.

The updated cached RGB characteristic value can be communicated between the managed portion 106 and the native portion 108 (or within either portion) as a single cached red-green-blue (RGB) value (which may be 32 bits, 64 bits, etc.). The data size of the cached RGB value which stores characteristic information of the drawing resource is considerably less than the data size that would store the OS drawing resource itself. For example, each time a user generates a system parameter call relating to a drawing resource, before a new drawing resource object is created, the drawing resource control method 300 determines whether a sufficiently similar drawing resource (which would provide a similar drawing operation) has previously been created and is stored within the native code portion 108.

If a sufficiently similar OS drawing resource 160 has been created and is stored within the native code portion 108, then that previously created drawing resource is used instead of creating a new OS drawing resource from scratch. As such, the number of system parameter calls associated with creating a new drawing resource is reduced. As illustrated in FIG. 4, the AGL 112 includes the pointer 408 that points to the location in the global cache 415, where one or more native drawing resource objects 428 and 430 are stored. Each native drawing resource objects 428 and 430 includes a reference count location.

Since the logical representation of the drawing resource (containing the RGB value) can be fully described with considerably less data than the full OS drawing resource, using this technique results in a quicker production of the OS drawing resource 160 once the managed code portion 106 requests the production of the OS drawing resource than in prior systems that must create an entirely new drawing resource in the operating system (and transfer the data associated with creating the pen). As such, the present system can use a just in time (JIT) compiler to transmit the draw parameter call. The performance of the JIT compiler is improved when only a limited amount of data is being transferred, and the transferred data is associated with a previously-compiled drawing resource. The effective use of JIT compilers not only improves the performance of resource constrained devices such as PDAs, embedded devices, microprocessor-based devices and the like, but also provides a considerable performance enhancement in personal computers, laptops, and other full-size computer environments 100.

By storing only one drawing resource for each one of (or a plurality of) the drawing resource of the same color that were created in the managed code portion 106 in the cache 113 of the AGL 112, the amount of data contained in each of the system parameter calls from the managed code portion 106 to the native code portion 108 is greatly reduced compared with system calls.

Garbage collection is simplified by the use of drawing resource control method 300 due to limiting the actual number of OS drawing resources 160 that are created. In prior systems, each draw call to the OS 526 would result in the creation of a new OS drawing resource 160, regardless of whether there is already an OS drawing resource of the same color in the OS 526. As such, there may be hundreds, or even thousands, of OS drawing resources 160 of the same color stored in the OS 526. The drawing resource control method 300 limits the number of OS drawing resources of the same RGB (color) value to one. In even memory constrained devices, there is no need to garbage collect one OS drawing resource 160 for each color which represents a relatively small amount of data. As such, the garbage collection task is considerably simplified.

Considering that in complex drawing programs such as CAD/CAM, many users create hundreds, or even thousands, of drawing resources across multiple OS drawing surfaces, the reduction in the number of system calls (by the use of system parameter calls which contain less data) greatly diminishes the number of code transitions across the VM/native boundary 260 between the managed code portion 106 to the native code portion 108. This diminution in the number of code transitions often reduces the processor load and improves the user's experience or the designer's expectations with the drawing programs, especially in resource constrained devices.

This storage (i.e., caching) of drawing resources contained in the native code portion 108 or the operating system 526 is performed in a manner that allows signal parameter calls that describe the parameters of other drawing resources contained within the application program 102 or the managed code portion 106 (prior to sending the other drawing resources to the native code portion 108) while limiting the amount of data transmitted between the managed code portion 106 and the native code portion 108.

Caching the drawing and other resources associated within the AGL 112 in the native code portion 108 reduces the number of native resources that must be accessed from remote locations (e.g., from a server) during the course of a UI based application's lifetime, and thereby reduces the number of system calls across the VM/native boundary 260 between the VM 202 and the native OS 208, 210. Limiting the amount of data contained in each system call across the VM/native boundary 260 between the virtual code portion 106 and the native code portion 108 acts to reduce the requisite data type marshaling overhead associated with such system calls compared to system parameter calls.

Figure 5:
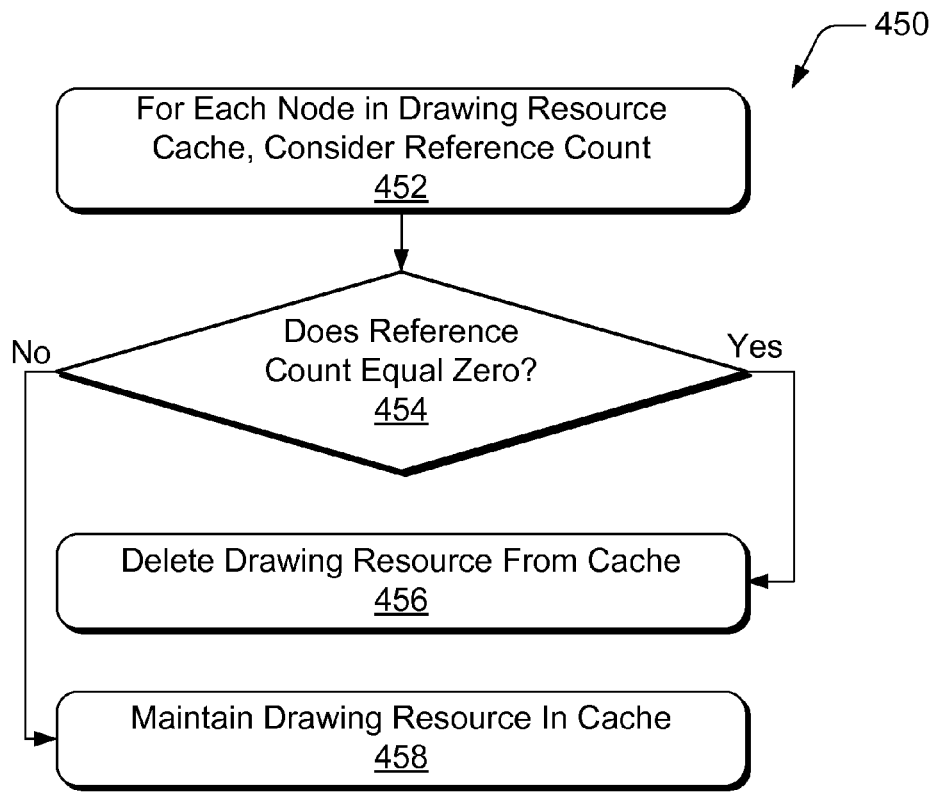
FIG. 5 illustrates a flow chart of one embodiment of an idle method that can be performed by the computer environment shown in FIG. 1.

FIG. 5 illustrates one embodiment of a drawing resource idle method 450 that is performed by the computer environment 100 when any drawing resource is idle, such as occurs when the user is not using or creating the AGL drawing resource 158 (which contains the RGB characteristic value). For example, the idle method 450 may be performed by the computer environment 100 when the user is not moving a mouse, so no input is being provided relating to the AGL drawing resource.

During the drawing resource idle method 450 that is run in the AGL 112, code is run at 452 for each drawing resource that looks at the reference count for the drawing resource. The AGL drawing resource 158 can be considered a node. The drawing resource idle method 450 continues to decision 454, in which the computer environment 100 considers whether the reference count of each AGL drawing resource 158 equals zero.

For each respective AGL drawing resource 158, if the answer to decision 454 is yes, the drawing resource idle method 450 continues to 456 and the drawing resource is deleted from the cache 113 (i.e. a memory location in the AGL 112 of the native code portion 108). If, by comparison, the answer to decision 454 is no, then the drawing resource idle method 450 continues to 458 in which the drawing resource is maintained in the cache 113 in the native code portion 108 (more particularly the global cache 415). The drawing resource idle method 450 therefore provides an effective technique to remove any drawing resource that is not being used for a reasonable period of time from the global cache 415 by the native code portion 108. This action may be considered as a form of garbage collection.

The methods described in this disclosure that are illustrated in FIGS. 3a, 3b, and 5 are intended to streamline the computer processing, and therefore provide an efficient method to allocate and to manage certain UI related OS resources. Such methods are especially suited to resource constrained devices. Even with the more powerful computers, though, it would still be desirable to follow good programming techniques to reduce the number of system calls (and use system parameter calls) to make the computers run faster and more reliably, thereby increasing the user's enjoyment and use of such application programs. Such reduction of the number of system parameter calls across the VM/native boundary 260 within any computer environment is within the intended scope of the present invention. One embodiment of a managed execution process of the present invention that is performed by the managed code portion 106 and the native code portion 108 as shown in FIG. 1 follows these guidelines:

a) Choose a compiler to associate with the application program 102. To obtain the benefits provided by the common language runtime, a developer can select one or more language compilers that target the runtime.

b) Compile the code to an intermediate language code (e.g., Microsoft intermediate language). This compiling translates the source code, XML, or other application program into the intermediate language, and also generates associated metadata. The intermediate language is a CPU-independent set of instructions that can be efficiently converted to the native code to ease the transition of data across the VM/native boundary 260 between the managed code portion 106 and the native code portion 108. The intermediate language includes instructions for loading, storing, initializing, and calling methods on objects, as well as instructions for arithmetic and logical operations, control flow, direct memory access, exception handling, and other operations. The metadata describes such parameters as the types in the code, including the definition of each type, the signatures of each type's members, the members that the code references, and the data that the runtime uses at execution time.

c) Compile the intermediate level code into native code. The native code portion 108 creates a native draw resource from a managed assembly and installs it into the native code portion 108 on the local computer. A native draw resource that is a file containing compiled processor-specific machine code is produced. In this disclosure, the logical representations of the drawing resources are referred to as being stored in the cache that is located in the AGL 112 of the native code portion 108. The actual drawing resource resides as the OS drawing resource 160 in the OS drawing surface 156. In different embodiments, the cache can be a physically distinct memory device that is set aside to store and retrieve drawing resources. Alternatively, the native code portion cache can be a portion of random access memory (RAM) contained in the computer environment 100, as described below, that is typically used to store and/or retrieve other data.

In this embodiment of execution of the VM 202, at execution time, the just-in-time (JIT) compiler in the native code portion 108 translates the intermediate language into the native code. During this compilation, the code passes a verification process that examines the intermediate language code and metadata to find out whether the code can be determined to be type safe. Before the intermediate language can be executed, it must be converted by the just-in-time (JIT) compiler of the VM 202 to the native code. The native code is a CPU-specific code that runs on the same computer architecture as the JIT compiler. Developers can write a set of instructions for the intermediate level language that can be JIT-compiled and executed on computers with different architectures. The managed code will run only on a specific operating system if it calls platform-specific, native application programming interfaces (API), or a platform-specific class library.

d) Execute the code. The common language runtime provides the infrastructure that enables the code execution (as well as a variety of services that can be used during execution) to take place. During execution, the OS drawing resource 160 is displayed on the OS drawing surface 156, and responds to use input. As such, user input to the keyboard or mouse of the computer environment 100 is mirrored by motion of the OS drawing resource 160 across the OS drawing surface. Before a process can be executed by the computer environment 100, it must be compiled to processor-specific code. Each process for which the intermediate language has been generated is JIT-compiled when it is called with a system parameter call for the first time, and then executed. The next time the process is executed, the existing JIT-compiled native code is executed. The process of JIT-compiling and then executing the code is repeated until execution is complete.

During execution, managed code receives services such as automatic memory management, security, interoperability with unmanaged code, cross-language debugging support, and enhanced deployment and versioning support. After a native draw resource is generated for an assembly program, the runtime automatically attempts to locate and use this native image each time it runs the assembly. If it is unable to find a suitable native image, the runtime reverts to a standard compiled program.

In the resource constrained computer environment 100 (e.g., certain networks and OS), reducing the number of resources used and increasing the efficiency and retrieval rate of data is important. Certain OS architectures, such as .NET and JAVA, involve the use of VMs (or managed code portions 106) that are capable of interfacing with the software from more than one native machine (or native code portion 108). When executing code in the environment of the managed code portion 106, the user interface (UI) components often represent hierarchical data structures that typically allocate native resources to realize the drawing resources. Executing code in the managed code portion 106 necessitates that the drawing resources in the native code portion 108 are synchronized with their counterparts in the managed code portion 106. Synchronization between the managed code portion 106 and the native code portion 108 should be frequently performed to reduce any differences between the code describing the drawing resources in the managed code portion 106 and the native code portion 108. Executing code in the native code portion 108, as is the case with the embodiment of drawing resource control method 300 shown in FIGS. 3a and 3b, limits the necessity for such synchronization.

In a network environment, including the computing environment 100 and the remote computer 548 as described later relative to FIG. 8, each one of the plurality of computers that form the computer environment 100 may be running different application programs and operating systems, and may have different capabilities and purposes. The VM has the capability of interfacing with a plurality of computers simultaneously to affect such networked activities as parallel processing with what appears to the user of the VM as a non-networked computer environment. One of the greatest challenges in creating an operating networked environment is to configure different computers having different operating systems to permit effective communication and data usage.

Figure 7:
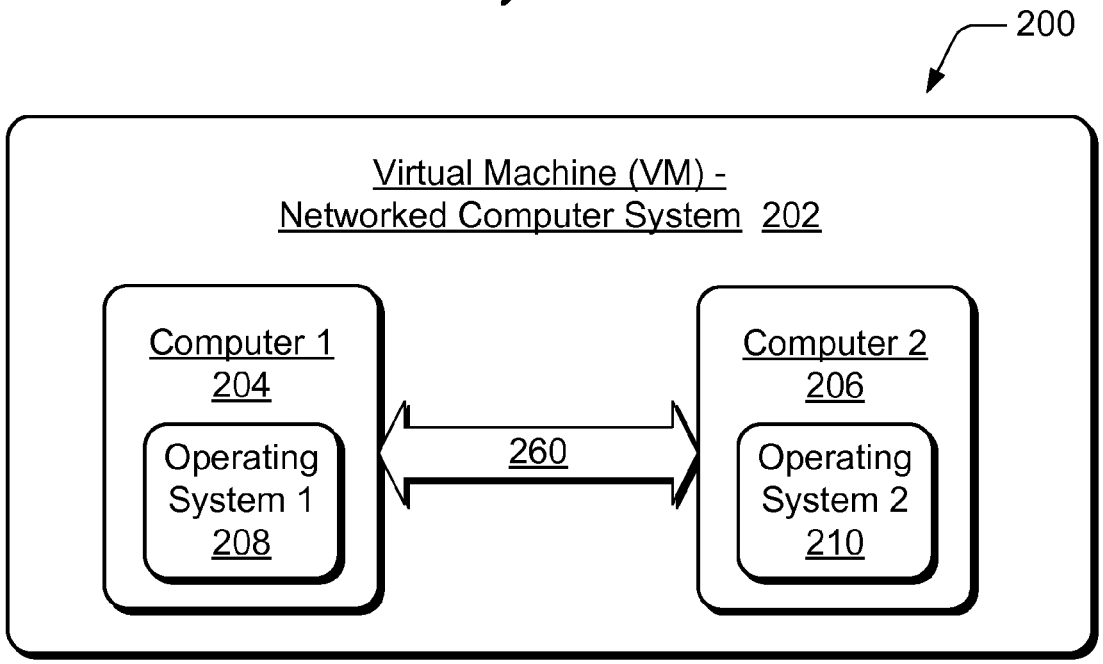
FIG. 7 illustrates one embodiment of a plurality of networked computers arranged within the virtual machine configuration.

The embodiment of virtual machine 202 shown in FIG. 7 combines multiple computer environments having the same or different operating systems (e.g., Microsoft Windows, Unix, and Apple OS) to function as a single computer environment. Also, eXtensible Markup Language (XML) is a computer language that permits one application program to utilize and/or modify the data produced by another application program. XML is an open industry standard managed by the World Wide Web Consortium. The VM 202 includes a first computer 204 having a first OS 208, and a second computer 206 with a second OS 210. The first computer 204 may be remote from the second computer 206, necessitating the user of a network to provide data communications. A user can access the VM 202 in a similar manner as a user would interface with the computing environment 100 or the remote computer 548.

The embodiment of VM 202 as shown in FIG. 7 most evidently interacts with the native OS in the client-server configuration within the network environment when, for example, a first OS 208 associated with a first computer 204 is interfacing with a second OS 210 associated with a second computer 206. Where there are a variety of different native OS, it is important that the VM/native boundary 260 between the VM 202 and the computers 204, 206 be configured in an operating system such as JAVA that can interface with a variety of native operating systems.

One embodiment of the VM 202 is considered as an operating system that runs the drawing resource (e.g., a computer pen, a computer paintbrush, or a computer font as illustrated in FIG. 4) within the managed code portion 106 to create a drawn portion 418. The computer environment 100 performs the method performed by the embodiment of computer environment 100 shown in FIG. 7 by which the drawing resource can be controlled by the user interface (UI) to the VM in the managed code portion 106. Data corresponding to the drawing resources can be stored in one embodiment of the virtual cache memory which configures the user of the VM 202 to access the drawing resource using system parameter calls having limited system latency compared to system calls between the VM 202 and the native OS 208 and 210.

When executing code in the native code portion 108 (i.e., the VM environment), the UI libraries use the system parameter calls to perform low level functionality such as drawing and window management. In such systems, drawing resources within the native code portion 108 are allocated based on one or more UI library system parameter calls. When the VM-managed code is finished with the resource, the drawing resource is then freed.

In one aspect, it would be desirable to store the codes (i.e., of the system parameter calls) of the drawing resource that are transmitted to the native code portion 108 in a VM managed memory included in the managed code portion 106, such as the cache memory 113. The code representing the drawing resources should be stored as native code in the native code portion 108. A computer language such as XML can be used to store the drawing resources in the managed code portion 106. XML is desired because it allows different application programs to display, organize, program, edit, and transfer data relating to drawing resources between different web devices and application programs while maintaining the ability to maintain the data characteristics.

XML separates the underlying data from the manner in which the data is displayed (and which may be controlled by the user). The data relating to the drawing resources may be accessed and "unlocked" by each web device so that the underlying program may be displayed, organized, programmed, edited, and transferred between web devices. Additionally, the web device that access the data can format to display the underlying data as desired.

FIG. 6 illustrates one embodiment of a drawing resource parameter string 700 that contains the characteristic RGB value which is transmitted between the managed code portion 106 and the native code portion 108 to manage the drawing resources. The drawing resource parameter string 700 includes a red-green-blue (RGB) color segment 701 and an optional drawing resource thickness segment 708. The RGB color segment 701 includes a red value portion 702, a green value portion 704, and a blue value portion 706.

The red value portion 702, the green value portion 704, and the blue value portion 706 each contain data that together define the RGB characteristic value which can describe the OS drawing resource 160. The combination of the red value portion 702, the green value portion 704, and the blue value portion 706 (the RGB characteristic value) can be contained within 32 bits or 64 bits of data. As such, the amount of data that has to be transmitted by the system parameter calls in transferring data relating to colors of drawing resources is relatively small, and is considerably smaller than the amount of data necessary to create an entire drawing resource which is contained in system calls.

Additionally, the amount of processor effort and memory storage space (e.g., storage space in the cache 113) allocated to comparing these 32 or 64 bit color values (including the red value portion, the green value portion, and the blue value portion of the RGB characteristic value) for drawing resources is much less than the respective processor effort and memory storage necessary to compare the larger amount of data describing the entire drawing resource. As such, the drawing resource control method 300 illustrated in FIGS. 3a and 3b, as well as the drawing resource idle method 450 illustrated in FIG. 5, can be performed quicker and more reliably by resource-constrained devices.

In certain embodiments, the drawing resource parameter string 700 includes the drawing resource dimension portion

708. The drawing resource dimension portion 708 can be used to describe the dimensions of the drawing object, and is used to manage (e.g., create, destroy, and/or maintain) drawing resources between the managed code portion 106 and the native code portion 108 in a similar manner (using an additional criterion) as described for each of the red value portion 702, the green value portion 704, and the blue value portion 706. The drawing resource dimension portion 708 can be used to measure thickness of a primitive line, dimension of a primitive object, font of a primitive letter or number, etc. The drawing resource dimension portion 708 can therefore be used to provide a considerable amount of information about a drawing resource utilizing a relatively small amount of data.

Figure 8:
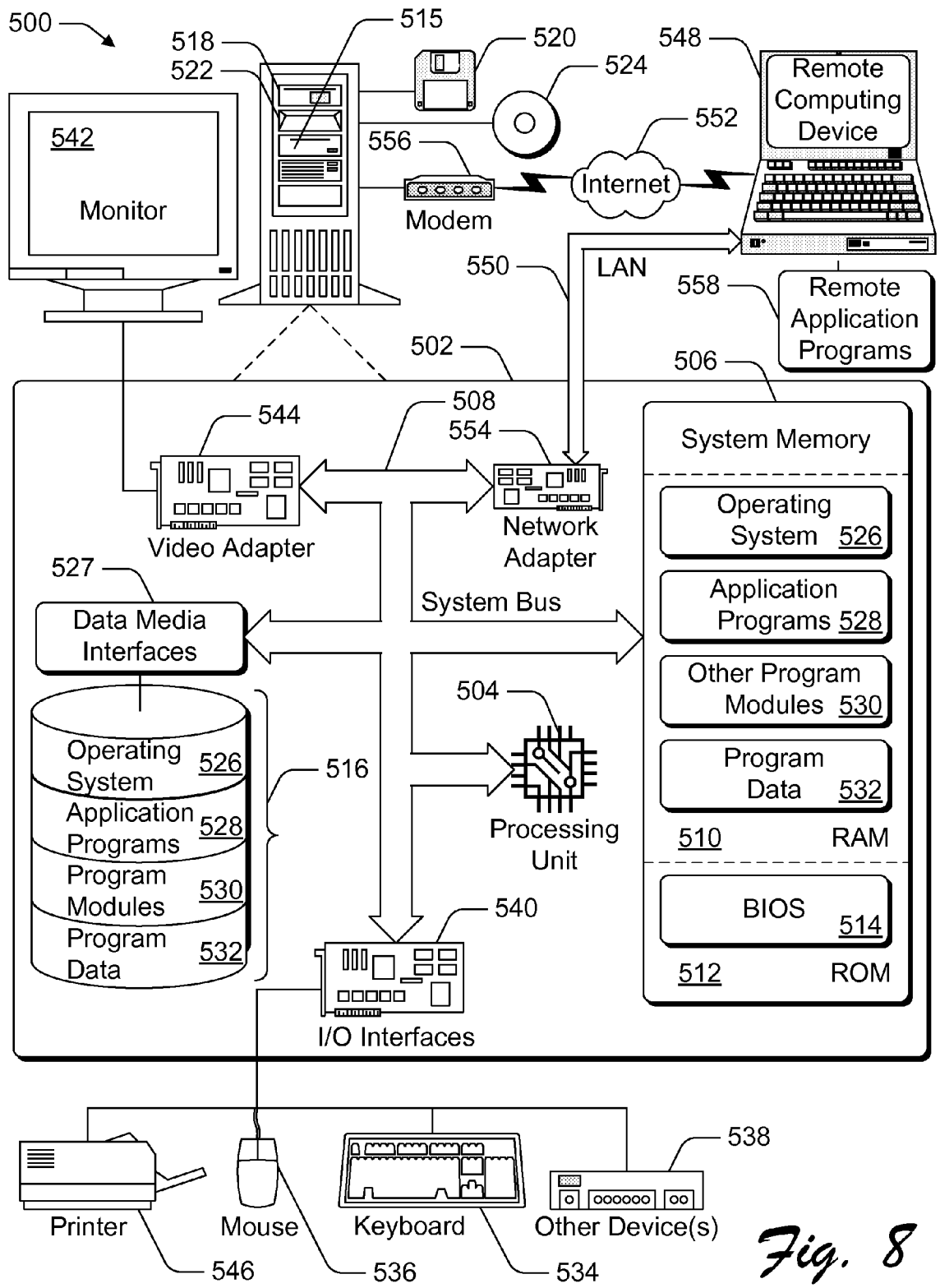
FIG. 8 illustrates a block diagram of the components associated with one embodiment of a computer environment shown in FIG. 1.

FIG. 8 illustrates an example of a suitable computer environment 500 or network which includes a user interface having hierarchical controls. The computer environment 500 manages drawing resources using the methods described above. The computer environment 500 can interface with the UI to cause the VM 202 and/or the native OS 208, 210 to perform the desired drawing function. To accomplish this, the computer environment 500 can perform the embodiment of drawing resource control method 300 shown in FIGS. 3a and 3b as well as the idle method 480 illustrated in FIG. 5.

The computer environment 500 illustrated in FIG. 8 is a general computer environment, which can be used to implement the techniques described herein. The computer environment 500 is only one example of a computer environment and is not intended to suggest any limitation as to the scope of use or functionality of the computer and network architectures. Neither should the computer environment 500 be interpreted as having any dependency relating to any one or combination of components illustrated in the exemplary computer environment 500.

The computer environment 500 includes a general-purpose computing device in the form of a computer 502. The computer 502 can be, for example, one or more of a stand alone computer, a networked computer, a mainframe computer, a PDA, a telephone, a microcomputer or microprocessor, or any other computer device that uses a processor in combination with a memory. The components of computer 502 can include, but are not limited to, one or more processors or processing units 504 (optionally including a cryptographic processor or co-processor), a system memory 506, and a system bus 508 that couples various system components including the processor 504 and the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 typically includes a variety of computer readable media. Such media can be any available media that is accessible by computer 502 and includes both volatile and non-volatile media, and removable and non-removable media.

The system memory 506 includes computer readable media in the form of non-volatile memory such as read only memory (ROM) 512, and/or volatile memory such as random access memory (RAM) 510. A basic input/output system (BIOS) 514, containing the basic routines that help to transfer information between elements within computer 502, such as during start-up, is stored in the ROM 512. The RAM 510 typically contains data and/or program modules that are immediately accessible to, and/or presently operated on, by the processing unit 504.

The computer 502 may also include other removable/non-removable, volatile/non-volatile computer storage media. By way of example, FIG. 8 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer readable media provide non-volatile storage of computer readable instructions, data structures, program modules, and other data for computer 502. Although the example illustrates a hard disk within the hard disk drive 515, a removable magnetic disk 520, and a non-volatile optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules 516 can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, game console, and the like. The remote computing device 548 is illustrated as a portable computer that can include many or all of the elements and features described herein relative to computer 502.

Logical connections between computer 502 and the remote computing device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computer environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer. It will be appreciated that the network connections shown and described are exemplary and other means of establishing a communications link between the computers may be used.

Various modules and techniques may be described herein in the general context of computer executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the systems and methods have been described in language specific to structural features and/or methodological steps, it is to be understood that the invention defined in the appended claims is not necessarily limited to the specific features or steps described. Rather, the specific features are disclosed as preferred forms of implementing the claimed invention.

The invention claimed is:

1. A method, comprising:
   receiving a parameter value at a native code portion as part of a parameter call from a managed code portion at a virtual machine, the parameter value representing a characteristic of a drawing resource stored in a cache memory within a native code portion;
   associating a reference count numeral to the drawing resource by:
      adding one to the reference count numeral each time a new drawing resource similar to the drawing resource stored in the cache memory is added to a memory within the managed code portion at the virtual machine;
      removing one from the reference count numeral each time an existing drawing resource is removed from the memory;
      maintaining the drawing resource in the cache memory when the reference count numeral is greater than zero; and
   using the parameter value to access or create an operating system (OS) drawing resource similar to the drawing resource stored in the cache memory to draw the OS drawing resource on an OS drawing surface.

2. The method of claim 1, further comprising removing the drawing resource from the cache memory when the reference count numeral equals zero.

3. The method of claim 1, further comprising removing the drawing resource from the cache memory when the drawing reference is idle for a predetermined duration of time.

4. The method of claim 1, further comprising removing the drawing resource from the cache memory when both the reference count numeral equals zero and the drawing reference is idle for a predetermined duration of time.

5. The method of claim 1, wherein the new drawing resource is associated with a second parameter value that is different from the parameter value that is associated with the drawing resource, wherein the parameter value is visually identical to the second parameter value on the OS drawing surface.

6. One or more computer-readable storage media having computer-readable instructions therein that, when executed by a computing device, cause the computing device to perform acts comprising:
   receiving a parameter value at a native code portion as part of a parameter call from a managed code portion at a virtual machine, the parameter value representing a characteristic of a drawing resource stored in a cache memory within a native code portion;
   associating a reference count numeral to the drawing resource by:

adding one to the reference count numeral each time a new drawing resource similar to the drawing resource stored in the cache memory is added to a memory within the managed code portion at the virtual machine;

removing one from the reference count numeral each time an existing drawing resource is removed from the memory;

maintaining the drawing resource in the cache memory when the reference count numeral is greater than zero;

removing the drawing resource from the cache memory when the reference count numeral equals zero; and using the parameter value to access or create an operating system (OS) drawing resource similar to the drawing resource stored in the cache memory to draw the OS drawing resource on an OS drawing surface.

7. The one or more computer-readable storage media of claim 6, wherein removing the drawing resource comprises removing the drawing resource from the cache memory when both the reference count numeral equals zero and the drawing resource is idle for a predetermined duration of time.

8. The one or more computer-readable storage media of claim 6, wherein the new drawing resource is associated with a first second parameter value that is different from the parameter value that is associated with the drawing resource, wherein the parameter value is visually identical to the second parameter value on the OS drawing surface.

9. An apparatus comprising:
a computing device;
one or more processors; and
one or more computer-readable storage media having computer-readable instructions therein that, when executed by the computing device, cause the computing device to perform acts comprising:
receiving a parameter value at a native code portion as part of a parameter call from a managed code portion at a virtual machine, the parameter value representing a characteristic of a drawing resource stored in a cache memory within a native code portion;

associating a reference count numeral to the drawing resource by:
adding one to the reference count numeral each time a new drawing resource similar to the drawing resource stored in the cache memory is added to a memory within the managed code portion at the virtual machine;

removing one from the reference count numeral each time an existing drawing resource is removed from the memory;

maintaining the drawing resource in the cache memory when the reference count numeral is greater than zero;

removing the drawing resource from the cache memory when the drawing resource is idle for a predetermined duration of time and the reference count numeral equals zero; and using the parameter value to access or create an operating system (OS) drawing resource similar to the drawing resource stored in the cache memory to draw the OS drawing resource on an OS drawing surface of the computing device.

10. The apparatus of claim 9, wherein the new drawing resource is associated with a second parameter value that is different from the parameter value that is associated with the drawing resource, wherein the parameter value is visually identical to the second parameter value on the OS drawing surface.

* * * * *